United States Patent
Ono et al.

(10) Patent No.: US 9,626,303 B2
(45) Date of Patent: Apr. 18, 2017

(54) DATA PROCESSING APPARATUS AND ADDRESS SPACE PROTECTION METHOD

(71) Applicant: Renesas Electronics Corporation, Kawasaki-shi (JP)

(72) Inventors: Rika Ono, Kawasaki (JP); Hitoshi Suzuki, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/739,544

(22) Filed: Jun. 15, 2015

(65) Prior Publication Data

US 2015/0278122 A1 Oct. 1, 2015

Related U.S. Application Data

(62) Division of application No. 12/314,227, filed on Dec. 5, 2008, now Pat. No. 9,087,015.

(30) Foreign Application Priority Data

Dec. 6, 2007 (JP) ................................. 2007-316301

(51) Int. Cl.
*G06F 12/14* (2006.01)

(52) U.S. Cl.
CPC ........ *G06F 12/1416* (2013.01); *G06F 12/145* (2013.01); *G06F 12/1425* (2013.01);
(Continued)

(58) Field of Classification Search
CPC ............. G06F 12/1416; G06F 12/1425; G06F 12/1441; G06F 12/1458; G06F 12/1433;
(Continued)

(56) References Cited

U.S. PATENT DOCUMENTS

| 7,068,545 B1 | 6/2006 | Kimelman et al. |
| 7,284,106 B1 | 10/2007 | Fernald |

(Continued)

FOREIGN PATENT DOCUMENTS

| JP | H 3-141446 | 6/1991 |
| JP | 2006-216012 | 8/2006 |

OTHER PUBLICATIONS

ARM Ltd., ARM1156T2F-S Technical Reference Manual Rev. R0P0C, Oct. 10, 2005.
(Continued)

*Primary Examiner* — Arpan P. Savla
(74) *Attorney, Agent, or Firm* — McGinn IP Law Group, PLLC.

(57) ABSTRACT

A data processing apparatus includes an instruction execution section, a protection control information storage section that stores protection control information that includes first protection information, and second protection information that is independent of the first protection information, an instruction protection information storage section that stores instruction protection information for specifying a partial address space of an instruction address space in which to store instructions that are executable by the instruction execution section, a data protection information storage section that stores data protection information for specifying partial address spaces of a data address space in which to store operands to be usable by the instruction execution section, and a protection violation determination section which, when the first protection information includes a first value, makes a determination as to whether to permit the instruction execution section to access the instruction address space according to the instruction protection information.

16 Claims, 6 Drawing Sheets

DURING EXECUTION OF APPLICATION PROGRAM

(52) U.S. Cl.
CPC ...... *G06F 12/1433* (2013.01); *G06F 12/1441* (2013.01); *G06F 12/1458* (2013.01); *G06F 12/1491* (2013.01); *G06F 2212/1052* (2013.01)

(58) Field of Classification Search
CPC ............... G06F 12/145; G06F 12/1491; G06F 2212/1052
See application file for complete search history.

(56) References Cited

U.S. PATENT DOCUMENTS

| | | |
|---|---|---|
| 2004/0088509 A1 | 5/2004 | Brucklmayr et al. |
| 2006/0179259 A1 | 8/2006 | Kershaw et al. |
| 2007/0250675 A1 | 10/2007 | Ono et al. |
| 2008/0276051 A1 | 11/2008 | Renno |
| 2009/0172332 A1 | 7/2009 | Ono et al. |

OTHER PUBLICATIONS

"TriCore 1 32-Bit Unified Processor Core vol. 1: Core Architecture V1.3.6", pp. 3-11-3-14, Oct. 2005.
U.S. Notice of Allowance dated Mar. 18, 2015 in U.S. Appl. No. 12/314,227.
U.S. Office Action dated May 21, 2014 in U.S. Appl. No. 12/314,227.
U.S. Office Action dated Oct. 3, 2013 in U.S. Appl. No. 12/314,227.
U.S. Office Action dated Apr. 25, 2013 in U.S. Appl. No. 12/314,227.
U.S. Office Action dated Oct. 1, 2012 in U.S. Appl. No. 12/314,227.
U.S. Office Action dated Sep. 30, 2011 in U.S. Appl. No. 12/314,227.
U.S. Office Action dated May 11, 2011 in U.S. Appl. No. 12/314,227.

Fig. 8A  DURING EXECUTION OF APPLICATION PROGRAM
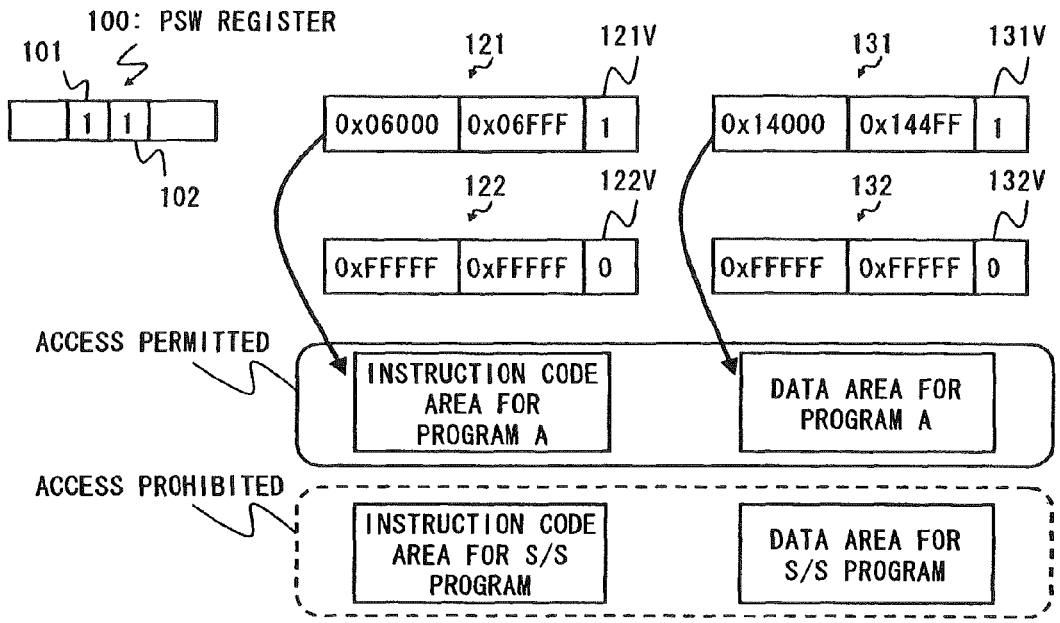
Fig. 8B  DURING EXECUTION OF S/S PROGRAM
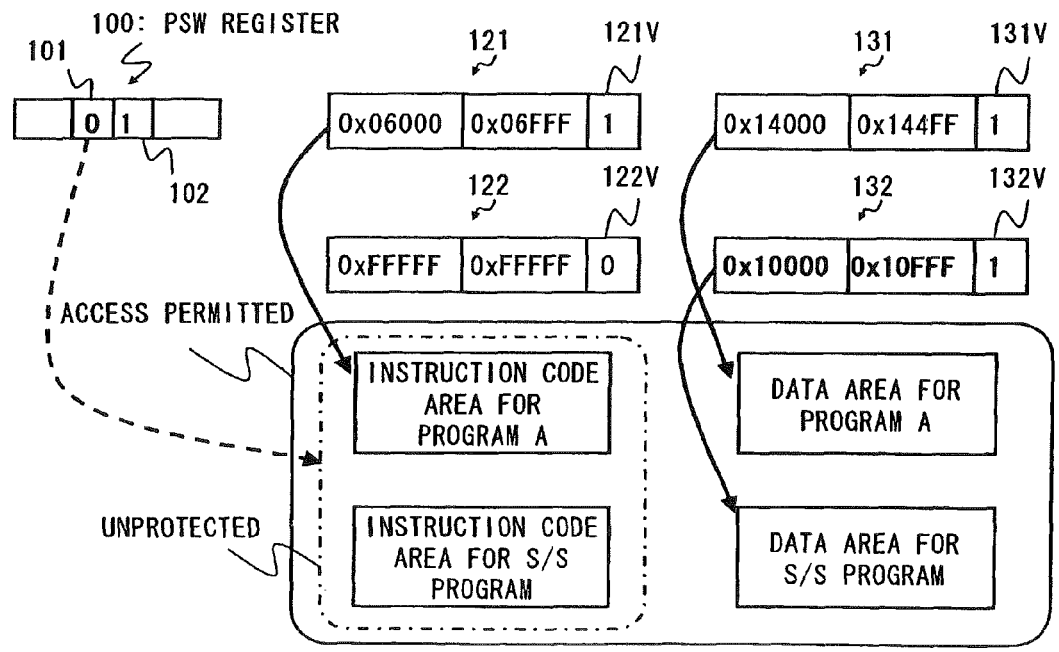

DATA PROCESSING APPARATUS AND ADDRESS SPACE PROTECTION METHOD

The present application is a Divisional Application of U.S. patent application Ser. No. 12/314,227, filed on Dec. 5, 2008, which is based on and claims priority from Japanese patent application No. 2007-316301, filed on Dec. 6, 2007, the entire contents of which are incorporated herein by reference.

BACKGROUND OF THE INVENTION

1. Field of the Invention

The present invention relates to an address space protection method for a data processing apparatus that switches and executes a plurality of programs.

2. Description of Related Art

A technology in which logical address spaces including an instruction address space and a data address space are protected from unauthorized access from a device that executes programs, such as a central processing unit (CPU), that is, so-called address space protection technology is known. According to the conventionally-known address space protection technology, for example, protection information for specifying an accessible partial address space in an address space, and an access destination address are compared when a CPU makes instruction fetch access, data write access, or data read access, thereby verifying the validity of access. Further, a technology is known in which contents of address space protection are changed according to a program executed by the CPU and a privilege level given to the program in advance.

Japanese Unexamined Patent Application Publication No. 3-141446 (hereinafter, referred to as "Patent Document 1"), for example, discloses a technology in which different privilege levels are given to each of OSs in a multi-OS system in which a plurality of operating system programs are run on a single CPU, to thereby restrict an accessible address space according to a difference in privilege level. Specifically, address information for specifying the accessible partial address space are correlated with the privilege level at which access to the partial address space is permitted, and correlated information is stored as protection information in a memory such as a register. Then, a memory protection circuit receiving access to the partial address space specified by the protection information permits the access only when the privilege level of an OS that makes memory access matches the privilege level specified by the protection information.

Further, Japanese Unexamined Patent Application Publication No. 2006-216012 (hereinafter, referred to as "Patent Document 2") discloses a technology in which address space protection is carried out based on specific protection information indicating a relation between a program and at least two protection types so as to apply different protection types of the address space protection to programs run at the same privilege level. As for two application programs A and B that are run at the same privilege level, for example, protection information for specifying contents of permitting access from a partial address space for the program A to a partial address space for the program B and prohibiting the access from the partial address space for the program B to the partial address space for the program A is stored in a register and the like. As a result, even though the programs have the same privilege level, it is possible to permit calling of the program B from the program A and prohibit calling of the program A from the program B, without switching the privilege level, for example.

Further, "TriCore 1 32-Bit Unified Processor Core Volume 1: Core Architecture V1.3.6" (hereinafter, referred to as "Non-Patent Document 1") issued by Infineon Technologies discloses a microcontroller including a plurality of memory protection register sets (see Chapter 8: Memory Protection System of Non-Patent Document 1). In this case, the memory protection register set refers to an assembly of a plurality of (specifically, four) memory protection registers, and each of the memory protection registers specifies a single accessible partial address space. More specifically, the microcontroller disclosed in Non-Patent Document 1 includes eight memory protection register sets in total, and each of the memory protection register sets consists of four memory protection registers as described above. To protect an instruction memory, four register sets are used to specify four accessible partial address spaces at maximum in the instruction address space. To protect a data memory, the remaining four register sets are used to specify four accessible partial address spaces at maximum in the data address space.

Further, in the microcontroller disclosed in Non-Patent Document 1, both the instruction protection register set and the data protection register set for using address space protection are switched at the same time upon switching of the execution program. Specifically, any one pair of the four pair of register sets each including a single instruction protection register set and a single data protection register set is selected as an active pair of register sets by using a 2-bit protection register set (PRS) field provided in a program status word (PSW) register.

The microcontroller disclosed in Non-Patent Document 1 rewrites the PRS field to select a pair of protection register sets for a system service program (hereinafter, abbreviated as "S/S program") in place of a pair of protection register sets for an application program, and uses the selected pair of register sets for the address space protection, when the application program calls the S/S program of different privilege level.

In short, the microcontroller disclosed in Non-Patent Document 1 realizes the address space protection with high reliability by using a different pair of protection register sets according to a difference in privilege level between programs. This configuration is advantageous in that the amount of processing required for updating a setting of the address space protection upon switching of the execution program can be reduced.

SUMMARY

There is a strong demand for a reduction in costs of a data processing apparatus such as a microcontroller. The present inventors have found a problem that the configuration of the microcontroller disclosed in Non-Patent Document 1 in which a large number of protection register sets for storing protection information for address space protection are disposed is insufficient for satisfying the demand for the reduction in costs.

The demand for a reduction in amount of processing required for updating the setting of the address space protection upon switching of an execution program, and the demand for achieving cost reduction while reducing the size of a memory device such as a register for storing address space protection information are conflicting demands. However, the data processing apparatus that satisfies the two conflicting demands can meet the needs from the market.

Note that neither Patent Document 1 nor Patent Document 2 meets the two conflicting demands, that is, the reduction in amount of processing required for updating the setting of the address space protection upon switching of the execution program, and the reduction in size of the memory circuit that stores the address space protection information.

A first exemplary aspect of the present invention is a data processing apparatus including: an instruction execution section; an instruction protection information storage section; a data protection information storage section; and a protection violation determination section. The instruction protection information storage section stores instruction protection information for specifying at least one partial address space accessible from the instruction execution section, in an instruction address space for storing instructions executed by the instruction execution section. The data protection information storage section stores data protection information for specifying a plurality of partial address spaces accessible from the instruction execution section, in a data address space for storing operands for use in an operation of the instruction execution section. The protection violation determination section determines whether or not to permit access from the instruction execution section based on the instruction protection information and the data protection information. Further, the data processing apparatus according to the first exemplary embodiment of the present invention is capable of selectively invalidating protection of the instruction address space using the instruction protection information storage section, independently of protection of the data address space using the data protection information storage section.

As described above, the data processing apparatus according to the first exemplary aspect of the present invention is capable of invalidating the protection of the instruction address space using the instruction protection information storage section, independently of the protection of the data address space using the data protection information storage section. In short, it is possible to selectively invalidate only the protection of the instruction address space according to a program executed by the instruction execution section.

In general, when the protection of the address spaces for two programs of different privilege levels (for example, application program and S/S program) is performed using the common instruction protection storage section and data protection storage section, it is necessary to update the memory content of each of the instruction protection storage section and the data protection storage section upon program switching. However, when a highly reliable S/S program which is sufficiently debugged is executed, it is necessary to protect the data address space, but it is conceivable that the instruction address space is not necessarily protected from unauthorized instruction fetch access. The data processing apparatus according to the first exemplary aspect of the present invention is capable of reducing the amount of processing required for rewriting the instruction protection storage section by selectively invalidating the protection of the instruction memory space when the program is switched to the highly reliably program.

According to the first exemplary aspect of the present invention, it is possible to provide a data processing apparatus that meets the two conflicting demands, that is, the reduction in amount of processing required for updating the contents of setting for the address space protection upon switching of the execution program, and the reduction in size of the memory circuit that stores address space protection information.

BRIEF DESCRIPTION OF THE DRAWINGS

The above and other exemplary aspects, advantages and features will be more apparent from the following description of certain exemplary embodiments taken in conjunction with the accompanying drawings, in which:

FIGS. 8A and 8B are conceptual diagrams for explaining memory protection setting in the data processing apparatus according to the first exemplary embodiment of the present invention.

DETAILED DESCRIPTION OF THE EXEMPLARY EMBODIMENTS

Figure 1:
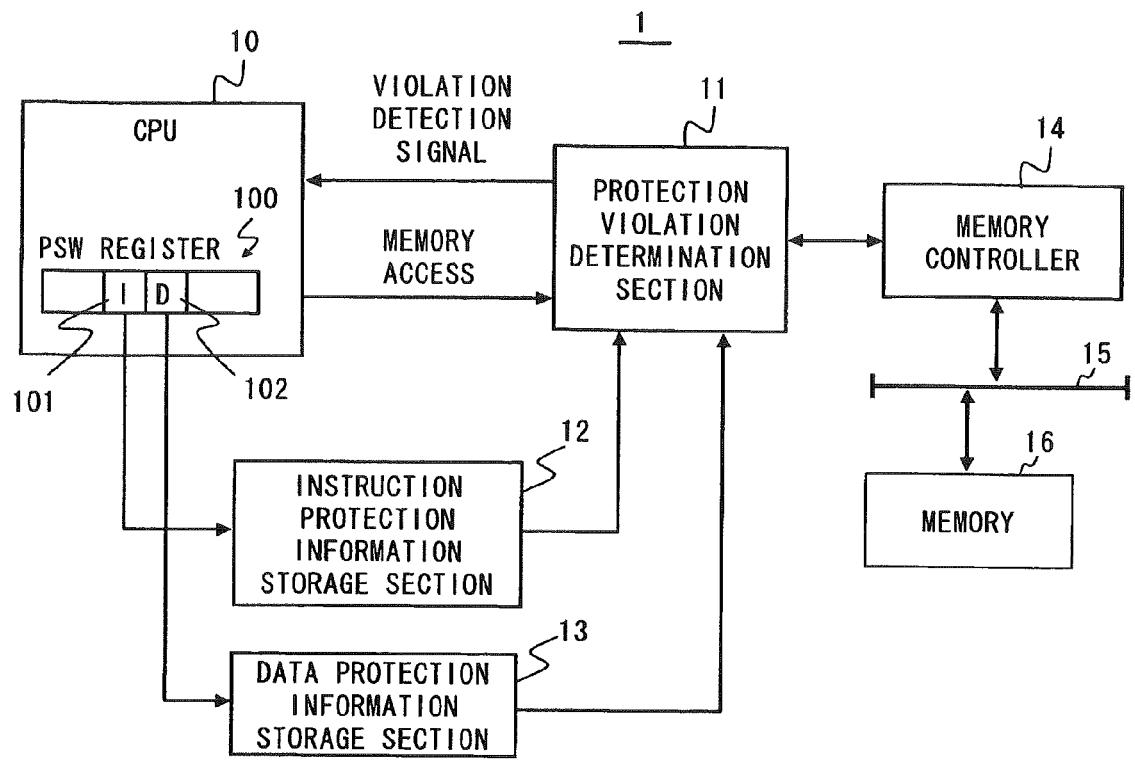
FIG. 1 is a block diagram showing the structure of a data processing apparatus according to a first exemplary embodiment of the present invention.

Hereinafter, exemplary embodiments of the present invention will be described in detail with reference to the accompanying drawings. In the drawings, the same components are denoted by the same reference numerals, and a redundant explanation thereof is omitted as needed to clarify the explanation.

[First Exemplary Embodiment]

A data processing apparatus 1 according to an exemplary embodiment of the present invention has a function of protecting address spaces. FIG. 1 is a block diagram showing the structure of a main part of the data processing apparatus 1. Referring to FIG. 1, a CPU 10 reads an instruction from a memory 16 by executing instruction fetch access and decodes the read instruction. Then, the CPU 10 executes processing corresponding to the decoded information. Examples of the processing include an arithmetic operation, a logical operation, and read access and write access to the memory 16.

Further, the CPU 10 is capable of switching and executing a plurality of programs under the control of an operating system program (OS). A program status word (PSW) register 100 is a register that holds various conditions for the program executed by the CPU 10.

A protection violation determination section 11 receives a memory access signal which is output from the CPU 10 and which indicates access to the memory 16. The memory access signal supplied from the CPU 10 contains a read/write type and an access destination address, and further contains write data when the access type is write access. The access destination address can be specified in various formats. For example, the access destination address may be specified by a single address so as to specify an access destination in units of one word. Alternatively, to specify the access destination in units of a plurality of words, the address destination may be specified by, for example, a combination of a base address and the size of data required to be transferred, or a combination of a lower bound address and an upper bound address of a location where the data required to be transferred is stored.

The protection violation determination section 11 compares instruction protection information or data protection information with a destination address of access requested by the CPU 10, to thereby determine whether or not to permit the access to the memory 16. The instruction protection information is stored in an instruction protection information storage section 12. The data protection information is stored in a data protection information storage section 13.

Specifically, if the access type of the CPU 10 is instruction fetch access, the protection violation determination section 11 permits the access of the CPU 10 to the memory, on condition that a partial address space (hereinafter, referred to as "access-permitted space"), which is specified by the instruction protection information stored in the storage section 12, contains the access destination address. On the other hand, if the access destination address of the CPU 10 is not contained in the access-permitted space, the protection violation determination section 11 prohibits the memory access. In this case, the determination section 11 may output a violation detection signal, which indicates the occurrence of unauthorized memory access, to the CPU 10. Further, if the access type of the CPU 10 is data read access or data write access, the protection violation determination section 11 permits the access of the CPU 10 to the memory, on condition that the access destination address is contained in the access-permitted space specified by the data protection information stored in the storage section 13.

The instruction protection information stored in the storage section 12 and the data protection information stored in the storage section 13 are set according to a program executed by the CPU 10. Further, those pieces of information are updated so that the contents of the information correspond to a destination program, upon program switching executed by the CPU 10. Each of the storage sections 12 and 13 is rewritten by an OS with a privilege level, which is activated when the program executed by the CPU 10 is switched, for example.

Note that, as in the case of the access destination address, specification of the partial address space using the instruction protection information and the data protection information can also be performed in various formats. For example, the specification of the partial address space in memory protection information may be performed using a combination of a lower bound address and an upper bound address of the partial address space, or using a combination of an initial address (lower bound address or upper bound address) of the partial address space and an area size. Further, by specifying the initial address of the memory area and the number of low-order bits to be masked, a power-of-two sized partial address space may be specified using the initial address. In other words, the method of specifying the partial address space to be protected is not particularly limited.

A memory controller 14 receives the memory access signal indicating that the memory access is permitted by the protection violation determination section 11, and accesses the memory 16 by using the access destination address specified by the memory access. If the access type is instruction fetch access or data read access, the memory controller 14 transfers the instruction or data read from the memory 16, to the CPU 10. If the access type is data write access, the memory controller 14 writes the data to the memory 16.

The memory 16 is connected to the memory controller 14 through a memory bus 15. The memory 16 is used as an instruction code storage area for storing an OS and an application program which are read and executed by the CPU 10, and is also used as a data storage area for storing data used by the OS and the application program. That is, the memory 16 is formed of a combination of a RAM, a ROM, a flash memory, and the like. Further, the memory bus 15 is a general term for an address bus and a data bus.

Furthermore, the data processing apparatus 1 is capable of setting validation of protection of an instruction address space using the instruction protection information storage section 12, and validation of protection of a data address space using the data protection information storage section 13, independently of each other, according to a program executed by the CPU 10. To realize the function, the data processing apparatus 1 includes an instruction protection control bit 101 and a data protection control bit 102 which are disposed in the PSW register 100.

The instruction protection control bit 101 indicates that the protection of the instruction address space with respect to the instruction fetch access of the CPU 10 is valid or invalid. For example, assuming that the control bit 101 is 1-bit information, a value indicating that the protection is invalid may be set as "0" and a value indicating that the protection is valid may be set as "1". When the value indicating that the protection is valid is set to the control bit 101, the protection violation determination section 11 executes determination as to whether or not to permit the access by using the instruction protection information storage section 12. On the other hand, when the value indicating that the protection is invalid is set to the control bit 101, the determination section 11 does not execute the determination as to whether or not to permit the access by using the instruction protection information. In short, when the instruction protection control bit 101 indicates that the protection of the instruction address space is invalid, the protection violation determination section 11 permits the instruction fetch access to the entire area of the instruction address space.

The data protection control bit 102 indicates that the protection of the data address space with respect to the data access (including data read access and data write access) of the CPU 10 is valid or invalid. For example, assuming that the control bit 102 is 1-bit information, a value indicating that the protection is invalid may be set as "0" and a value indicating that the protection is valid may be set as "1". When the value indicating that the protection is valid is set to the control bit 102, the protection violation determination section 11 executes determination as to whether or not to permit the access by using the data protection information storage section 13. On the other hand, when the value indicating that the protection is invalid is set to the control bit 102, the determination section 11 does not execute the determination as to whether or not to permit the access by using the data protection information. In short, when the data protection control bit 102 indicates that the protection of the data address space is invalid, the protection violation determination section 11 permits the data access to the entire area of the data address space.

Note that the control bits 101 and 102 are capable of selecting validity or invalidity independently of each other in response to an instruction from the OS. According to an exemplary embodiment of the present invention, the protection of both the instruction address space and the data address space is performed by activating both the control bits 101 and 102 during execution of an application program. On the other hand, during execution of an OS, an S/S program, or the like having a privilege level higher than that of the application program, both the instruction protection control bit 101 and the data protection control bit 102 are deactivated, and the protection of both the instruction address space and the data address space is not performed. Alternatively, during execution of an OS, an S/S program, or the like, only the protection of the data address space is carried out by selectively deactivating only the instruction protection control bit 101. Specific examples of a procedure for changing an address space protection level in association with an operation in which the application program calls the S/S program, and of a procedure for changing the address space protection level upon returning from the S/S program to the application program will be described later.

Note that the configuration of FIG. 1 in which the protection control bits 101 and 102 are stored in the PSW register 100 is merely an example. That is, the protection control bits 101 and 102 are only necessary to be stored in a memory circuit accessible from the CPU 10 that executes a privilege level program, such as an OS.

Figure 2:
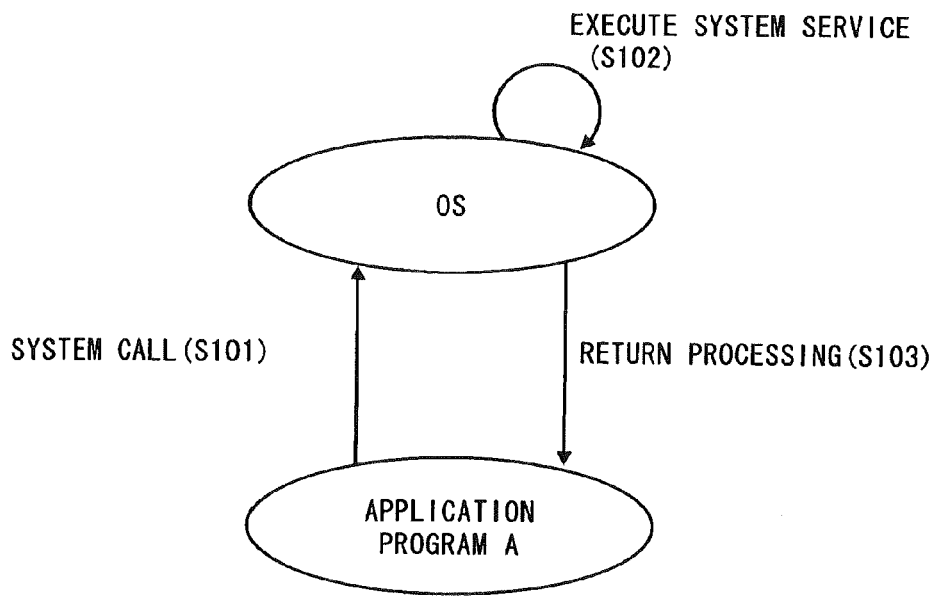
FIG. 2 is a conceptual diagram for explaining a program calling operation in the data processing apparatus according to the first exemplary embodiment of the present invention.

In the following, the structure and operations of each of the components included in the data processing apparatus 1 shown in FIG. 1 will be described in detail. FIG. 2 is a conceptual diagram for explaining the program executed by the CPU 10, and shows an example where the S/S program is executed in response to a system call from an application program A. In this case, the S/S program is an example of programs run at a privilege level higher than that of the application program A.

When the application program A executed by the CPU 10 requests execution of the S/S program, a system call is issued by a software interrupt (S101). When the system call is issued, the execution of the application program A is interrupted, and branch processing for causing a branch to the S/S program is carried out by the OS that performs switching of the execution program.

Figure 3:
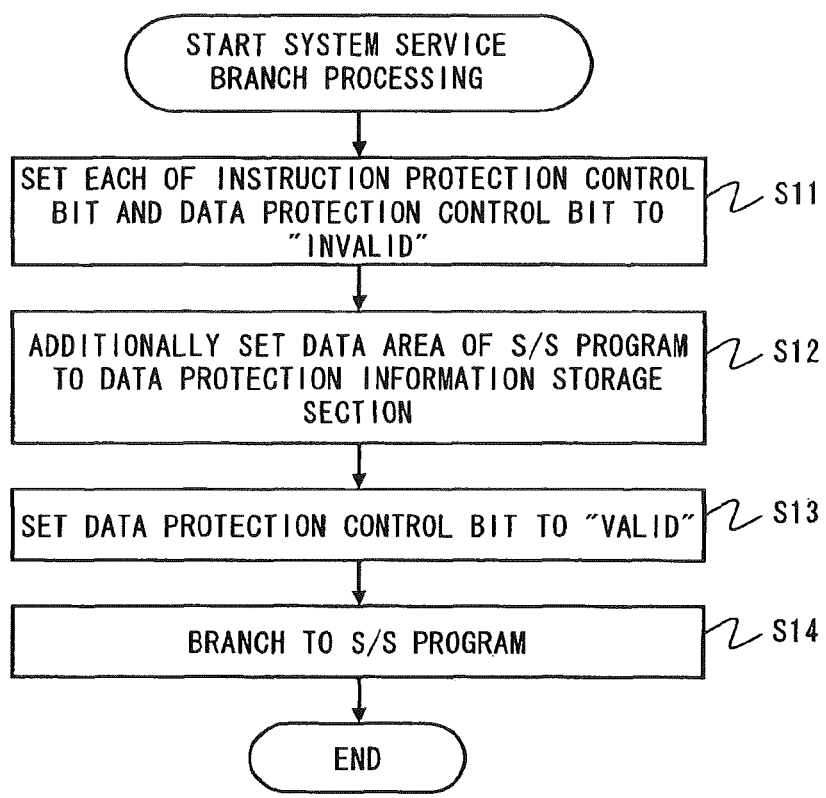
FIG. 3 is a flowchart showing a procedure for calling an S/S program in the data processing apparatus according to the first exemplary embodiment of the present invention.

A specific example of the procedure for causing the branch to the S/S program is described with reference to the flowchart of FIG. 3. In Step S11, the instruction protection control bit 101 and the data protection control bit 102 are set to "invalid" in accordance with the software interrupt generated by the system call.

In Step S12, the OS that performs switching of the execution program additionally sets a data area for the S/S program as well as a data area for the application program A of the calling source, to the data protection information storage section 13. Herein, the data area for the application program A refers to a memory area in which operands for use in the application program A and an execution result of the application program A are stored. The data area for the application program A indicates a partial address space that is a part of the data address space which is to be permitted to be accessed by the application program A. Similarly, the data area for the S/S program refers to a memory area in which operands for use in the S/S program and an execution result of the S/S program are stored, and indicates a partial address space that is a part of the data address space which is to be permitted to be accessed by the S/S program.

In Step S13, the OS validates the protection of the data address space by activating the data protection control bit 102. On the other hand, the instruction protection control bit 101 remains deactivated. The OS does not update the instruction protection information storage section 12, and the storage section 12 maintains a state in which an instruction code area for the application program A is set as the access-permitted space.

Lastly, in Step S14, a program counter (not shown) is updated and a branch is made to the S/S program, thereby starting the execution of the S/S program.

Referring again to FIG. 2, the description will be continued. When the branch processing for causing a branch to the S/S program is carried out, the S/S program is executed (S102). When the execution of the S/S program is normally terminated, the OS executes processing for returning to the application program A as the calling source (S103).

Figure 4:
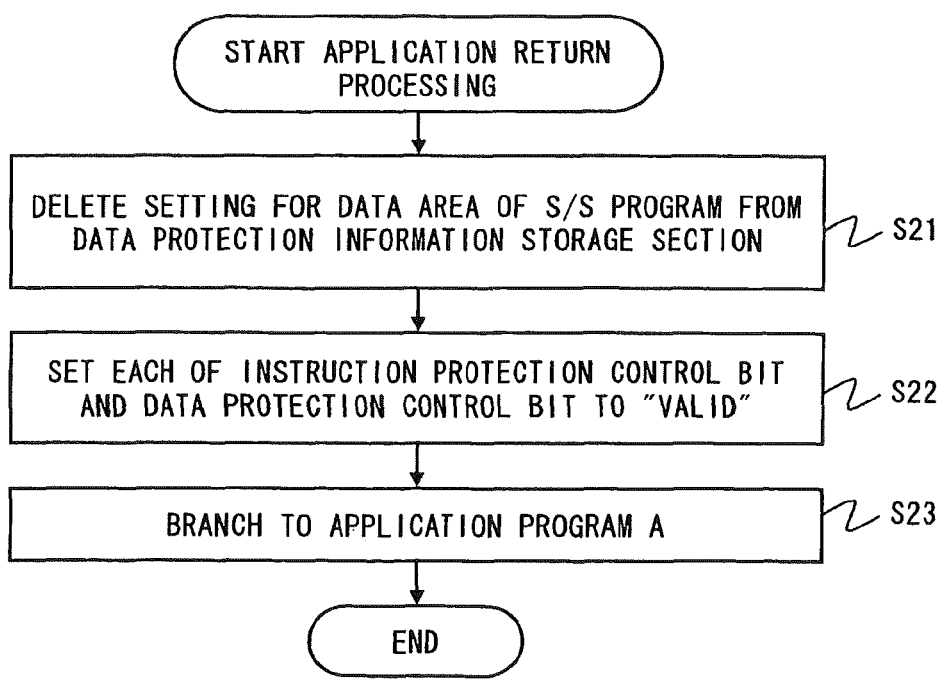
FIG. 4 is a flowchart showing a procedure for returning from the S/S program to an application program of a calling source in the data processing apparatus according to the first exemplary embodiment of the present invention.

A specific example of the procedure for returning the application program A will be described with reference to the flowchart of FIG. 4. In Step S21, the contents of setting for the data area for the S/S program, which is additionally set in the data protection information storage section 13, are deleted. In Step S22, the OS restores the state of the PSW register 100 in the case where the execution of the application program A is interrupted. As a result, not only the data protection control bit 102 which has been already activated, but also the instruction protection control bit 101 is activated, which makes it possible to execute the protection of both the instruction address space and the data address space.

Note that, as described above, the protection of the instruction address space is not executed during the execution of the S/S program, and the instruction protection information storage section 12 maintains the state where the instruction code area for the application program A is set as the access-permitted space. Accordingly, it is not necessary to perform the updating of the storage section 12 again in the case of returning the application program A.

Lastly, in Step S23, a program counter (not shown) is updated, and the application program A is resumed from a time point when the execution is interrupted.

Figures 5A, 5B:
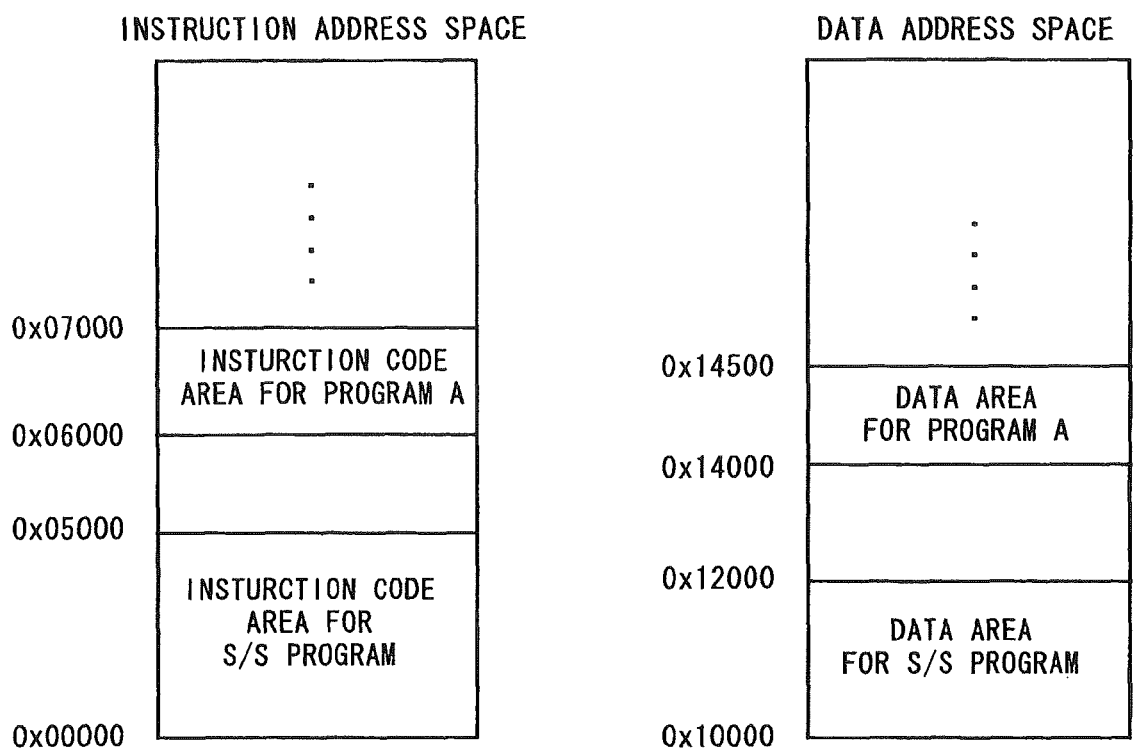
FIGS. 5A and 5B are diagrams each showing a memory map for explaining address space protection in the data processing apparatus according to the first exemplary embodiment of the present invention.

FIGS. 5A and 5B each show an example of a memory map of the memory 16. FIG. 5A is a memory map showing the instruction address space. In the example shown in FIG. 5A, an area having addresses 00000 to 04FFF corresponds to the instruction code area for the S/S program, that is, an area storing the S/S program. Further, an area having addresses 06000 to 06FFF corresponds to the instruction code area for the application program A. FIG. 5B is a memory map showing the data address space. In the example shown in FIG. 5B, an area having addresses 10000 to 11FFF corresponds to the data area for the S/S program, and an area having addresses 14000 to 144FF correspond to the data area for the application program.

Figure 6A:
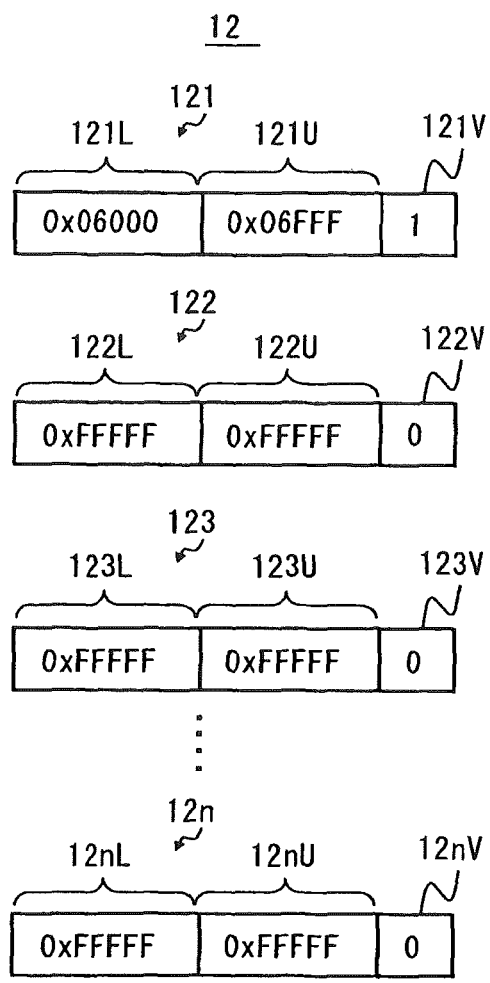
FIGS. 6A and 6B are diagrams showing examples of the structures of an instruction protection information storage section and a data protection information storage section, respectively, which are included in the data processing apparatus according to the first exemplary embodiment of the present invention.
Figure 6B:
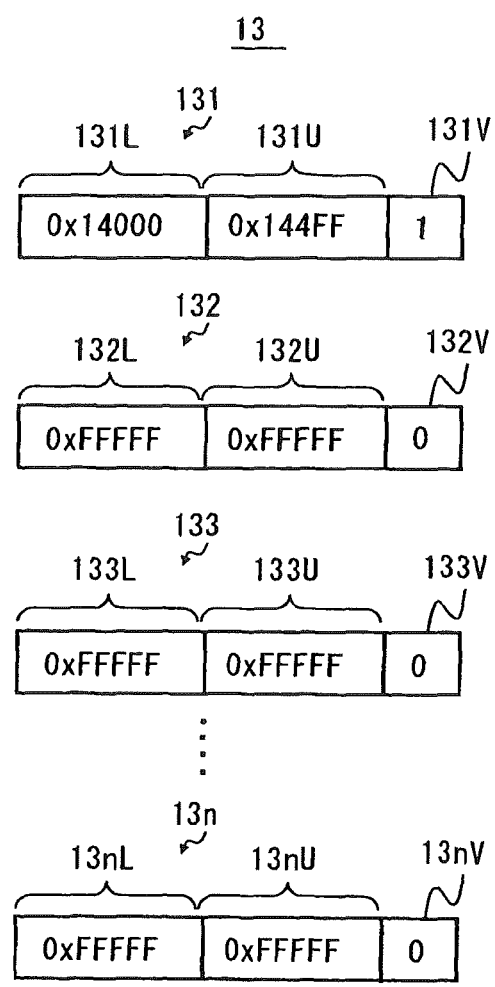
Figure 7A:
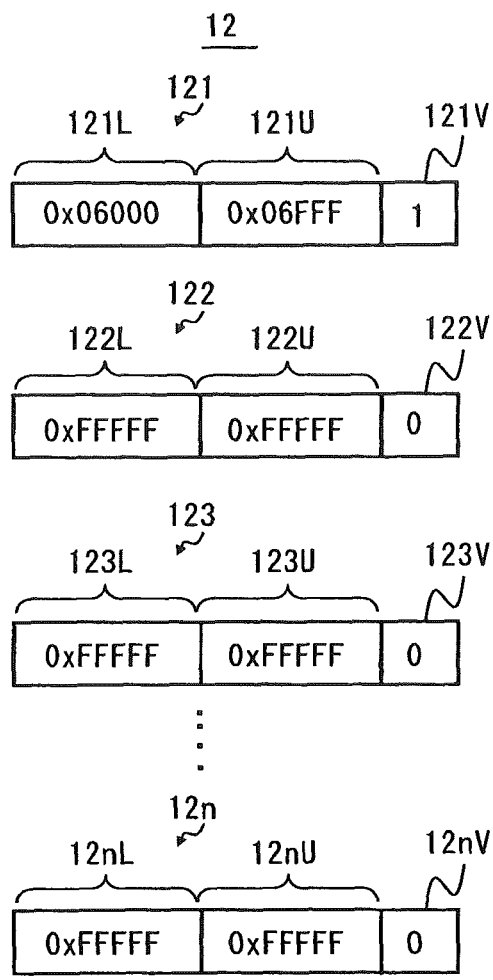
FIGS. 7A and 7B are diagrams showing examples of the structures of an instruction protection information storage section and a data protection information storage section, respectively, which are included in the data processing apparatus according to the first exemplary embodiment of the present invention.
Figure 7B:
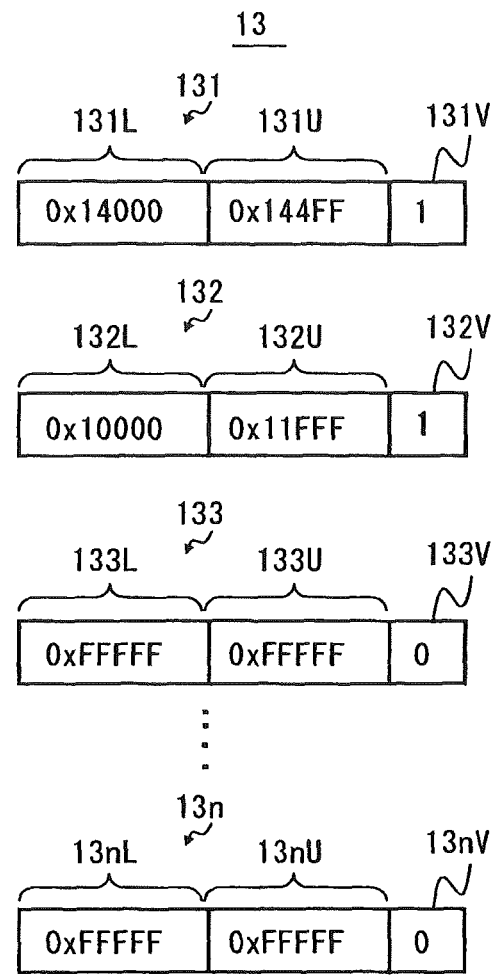

FIGS. 6A and 7A are diagrams each showing a specific example of the configuration of the instruction protection information storage section 12 and, FIGS. 6B and 7B are diagrams each showing a specific example of the configuration of the data protection information storage section 13.

Note that FIGS. 6A and 6B each show the setting of each of the storage sections 12 and 13 at the time of the executing the application program A.

In the example shown in FIG. 6A, the instruction protection information storage section 12 includes n number of instruction protection registers 121 to 12n, and each of the instruction protection registers specifies a single accessible partial address space (hereinafter, referred to as "access-permitted space"). Similarly, in the example shown in FIG. 6B, the data protection information storage section 13 includes n number of data protection registers 131 to 13n, and each of the data protection registers specifies a single access-permitted space.

For example, the instruction protection register 121 shown in FIG. 6A holds the setting corresponding to the instruction code area for the application program A shown in FIG. 5A. The address "06000" is assigned to a lower bound address assignment section 121L, and the address "06FFF" is assigned to an upper bound address assignment section 121U. Further, the data protection register 131 shown in FIG. 6B holds the setting corresponding to the data area for the application program A shown in FIG. 5B. The address "14000" is assigned to a lower bound address assignment section 131L, and the address "144FF" is assigned to an upper bound address assignment section 131U.

Furthermore, in the example of the instruction protection information storage section 12 shown in FIG. 6A, n number of valid bit storage sections 121V to 12nV respectively corresponding to the n number of instruction protection registers 121 to 12n are provided. For example, the valid bit storage section 121V corresponding to the instruction protection register 121 stores a valid bit indicating whether the assignment of the access-permitted space indicated by the address assignment sections 121L and 121U is valid or not.

In the example shown in FIG. 6A, when the value of the valid bit storage section 121V is "1", the value indicates that the assignment of the access-permitted space by address assignment sections 121L and 121U is valid. On the other hand, when the value of the valid bit storage section 121V is "0", the value indicates that the assignment of the access-permitted space by address assignment sections 121L and 121U is invalid. In other words, the value indicates that the register 121 is not used for the setting of the access-permitted space even when a valid partial address space is assigned to address assignment sections 121L and 121U.

The valid bit storage sections 121V to 12nV are each set based on the instruction of the OS that performs program switching. Note that when the instruction protection control bit 101 disposed in the PSW register 100 is deactivated, the protection based on the instruction protection information is invalidated. Accordingly, the protection violation determination section 11 permits the access to the entire area of the instruction address space, regardless of the set values of the valid bit storage sections 121V to 12nV.

The example of the data protection information storage section 13 shown in FIG. 6B also includes n number of valid bit storage sections 131V to 13nV respectively corresponding to the n number of data protection registers 131 to 13n in a similar manner as in FIG. 6A. A procedure for setting the valid bit storage sections 131V to 13nV and a process for invalidating the protection of the data address space based on the setting of the valid bit storage sections 131V to 13nV may be carried out in the same manner as described in the valid bit storage sections 121V to 12nV for protecting the instruction address space.

On the other hand, FIGS. 7A and 7B respectively show the set contents of the instruction protection information storage section 12 and the data protection information storage section 13 at the time of executing the S/S program. As described above, as for the protection of the instruction address space, the data processing apparatus 1 is characterized in that the protection of the instruction address space is not performed at the time of executing the S/S program having a privilege level higher than that of the application program A. Further, as for the protection of the data address space, the data processing apparatus 1 is characterized by permitting the access to the data area for the S/S program as well as the data area for the application program A accessible from the application program A of the calling source, at the time of executing the S/S program.

For example, when the S/S program is executing, it is not necessary to change the valid bit storage sections 121V to 12nV respectively corresponding to the instruction protection registers 121 to 12n shown in FIG. 7A, upon execution of the application program A shown in FIG. 6A. This is because, according to this exemplary embodiment of the present invention, the protection violation determination section 11 permits the instruction fetch access to the entire instruction address space when the instruction protection control bit 101 is deactivated as described above. It should be noted here that values stored in the instruction protection register 121 are held as values corresponding to the calling application program A. Thus, at the time of returning to the application program A, the protection state of the instruction address space corresponding to the application program A can be restored only by activating the instruction protection control bit 101 without updating the values stored in the instruction protection register 121.

Referring to FIG. 7B, values stored in the data protection register 131 are maintained as values of setting for the application program A shown in FIG. 6B. In addition, referring to FIG. 7B, the setting for enabling access to the data area of the S/S program is additionally written to the data protection register 132. Specifically, a lower bound address "10000" of the data area of the S/S program shown in FIG. 5B is assigned to the lower bound address assignment section 132L, and an upper bound address "11FFF" is assigned to the upper bound address assignment section 132U.

As is apparent from the configuration examples shown in FIG. 6B and FIG. 7B, the data processing apparatus 1 performs the protection of the data address space by using a common memory resource (for example, data protection registers 131 to 13n) for the application program A and the S/S program which have different privilege levels. As a result, the size of the memory resource for storing the data protection information necessary for the protection of the data address space can be reduced. Further, the data processing apparatus 1 additionally sets the access-permitted space for the S/S program with respect to the data protection registers 131 to 13n whose setting correspond to the application program A, thereby enabling transition to a suitable protection state of the data address space corresponding to the S/S program. Furthermore, in the case of returning to the application program A upon completion of the execution of the S/S program, the additional setting for the access-permitted space corresponding to the S/S program is deleted, thereby making it possible to restore the protection state of the suitable data address space corresponding to the application program A.

FIGS. 8A and 8B are conceptual diagrams each showing relations between the setting of each of the instruction and data protection control bits 101 and 102, the setting of each of the instruction and data protection information storage sections 12 and 13, and the protection state of the address spaces. FIG. 8A shows the case where the application program A is executed, and FIG. 8B shows the case where the S/S program is executed.

The data processing apparatus 1 executes the protection of both the instruction address space and the data address space at the time of executing the application program A. Thus, both the instruction and data protection control bits 101 and 102 are activated and the value "1" is set to both the bits as shown in FIG. 8A. Further, the instruction protection register 121 holds address information of the instruction code area for the application program A shown in the memory map of FIG. 5A, and the valid value "1" is set to the valid bit storage section 121V. Note that, since the instruction address space shown in FIG. 5A has a single partial address space that is permitted to be accessed by the application program A, the instruction protection registers 122 to 12$n$ shown in FIG. 8A are not in use. Accordingly, the invalid value "0" is set to each of the valid bit storage sections 122V to 12$n$V respectively corresponding to the unused registers 122 to 12$n$.

Similarly, the data protection register 131 holds address information of the data area for the application program A indicated on the memory map of FIG. 5B, and the valid value "1" is set to the valid bit storage section 131V. Further, since the data protection registers 132 to 13$n$ shown in FIG. 8A are not in use, the invalid value "0" is set to each of the valid bit storage sections 132V to 13$n$V.

The protection violation determination section 11 determines whether or not to permit the access to the memory 16 based on the set contents of each of the instruction protection registers 121 to 12$n$ and the data protection registers 131 to 13$n$, thereby permitting the access to the instruction code area and data area for the application program A, and prohibiting the access to the instruction code area and data area for the S/S program.

On the other hand, at the time of executing the S/S program, the data processing apparatus 1 executes only the protection of the data address space by selectively invalidating the protection of the instruction address space. For this reason, the instruction protection control bit 101 is deactivated and the value "0" is set thereto as shown in FIG. 8B. As a result, the protection of the instruction address space is not performed during the execution of the S/S program, and the entire instruction address area is accessible. In this case, values stored in the instruction protection register 121 corresponding to the instruction code area for the application program A are maintained.

Furthermore, in order to protect the data address space during the execution of the S/S program, the data processing apparatus 1 adds a setting for enabling access to the data area for the S/S program while holding the setting for the data area for the application program A. Referring to FIG. 8B, the data processing apparatus 1 additionally assigns the data area for the S/S program to the data protection register 132 while holding the contents of setting for the application program A in the data protection register 131, and the value of the valid bit storage section 132V is rewritten to the valid value "1". Through the settings, the access of the CPU 10 to each of the data areas of the application program A and the S/S program is permitted and the access to the other data address spaces is prohibited during the execution of the S/S program.

As described above, the data processing apparatus 1 according to an exemplary embodiment of the present invention performs the protection of the address spaces for each of the application program A and the S/S program of different privilege levels, by using the common memory resource (for example, instruction protection registers 121 to 12$n$ and data protection registers 131 to 13$n$).

Furthermore, the data processing apparatus 1 selectively invalidates the protection of the instruction address space by operating the instruction protection control bit 101 upon program switching from the application program A to the S/S program. Thus, the access to the instruction code area for the S/S program is enabled without updating the setting of the instruction protection information storage section 12 which is set so as to correspond to the application program A. In other words, it is possible to execute the S/S program while maintaining the setting of the instruction protection information storage section 12 as the setting corresponding to the application program A. As a result, when the program is returned from the S/S program to the application program A, the protection of the instruction address space corresponding to the application program A can be started only by activating the instruction protection control bit 101 without updating the address setting of the instruction protection information storage section 12.

Further, when updating the setting of the data protection information storage section 13 to the setting corresponding to the S/S program, the data processing apparatus 1 uses the setting of the memory circuit (for example, the data protection register 131) storing set contents corresponding to the application program A of the calling source. Furthermore, the data processing apparatus 1 additionally sets the values corresponding to the data area for the S/S program to another memory circuit such as the data protection register 132. Thus, when the program is returned from the S/S program to the application program A, the additionally setting corresponding to the data area for the S/S program are deleted, thereby making it possible to start the protection of the data address space corresponding to the application program A with a small amount of processing.

In short, the data processing apparatus 1 is capable of starting the address space protection corresponding to the S/S program by: (1) deactivating the instruction protection control bit 101; (2) activating the data protection control bit 102; and (3) adding the setting corresponding to the data area for the S/S program to the data protection information storage section 13. Further, the data processing apparatus 1 is capable of returning to the address space protection corresponding to the application program A with a small amount of processing by (1) activating the instruction protection control bit 101 and (2) deleting the additional setting corresponding to the data area for the S/S program from the data protection information storage section 13.

To transmit information indicating that the protection of the instruction address space using the instruction protection information storage section 12 is selectively invalidated, to the protection violation determination section 11, a memory circuit such as a register accessible from the determination section 11 and is updated based on the contents of the instruction protection control bit 101 may be provided, for example.

Further, as shown in FIGS. 6A to 8B, the configuration in which the valid bit storage section is provided to each of the instruction protection registers 121 to 12$n$ is merely an example of specific configurations for transmitting the information indicating that the setting of each of the instruction protection registers are valid, to the protection violation determination section 11. For example, the information indicating that the setting of each of the instruction protection registers 121 to 12$n$ are valid may be transmitted to the determination section 11 by writing an invalid value (for example, FFFFF) for each of an upper bound address and a lower bound address. The same is applied to the configuration of each of the data protection registers 131 to 13n.

[Other Exemplary Embodiment]

The structure of the data processing apparatus 1 capable of setting validation/invalidation of the protection of the instruction address space and validation/invalidation of the protection of the data address space, independently of each other, is merely an example. For instance, the data processing apparatus 1 may be capable of selectively invalidating only the protection of the instruction address space without invalidating the protection of the data address space. In this case, only the instruction protection control bit 101 may be provided instead of providing the data protection control bit 102, for example.

Referring to FIG. 1 showing the first exemplary embodiment of the present invention, the memory 16 may be disposed outside the data processing apparatus 1. The structure in which the memory 16 is connected to the protection violation determination section 11 through the memory controller 14 is merely an example. For example, in the case of DMA transfer, the protection violation determination section 11 and the memory 16 may be connected to each other through a DMA controller that controls the DMA transfer.

The above-mentioned data processing apparatus 1 may be implemented as a microcomputer formed into a single chip, or may be implemented as a computer system formed of a plurality of chips.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A data processing apparatus, comprising:
an instruction execution section;
a protection control information storage section that stores protection control information that includes:
first protection information; and
second protection information that is independent of the first protection information;
an instruction protection information storage section that stores instruction protection information for specifying a partial address space of an instruction address space in which to store instructions that are executable by the instruction execution section;
a data protection information storage section that stores data protection information for specifying partial address spaces of a data address space in which to store operands to be usable by the instruction execution section; and
a protection violation determination section which, when the first protection information comprises a first value, makes a first determination as to whether to permit the instruction execution section to access the instruction address space according to the instruction protection information and which, when the second protection comprises a first value, makes a second determination as to whether to permit the instruction execution section to access the data address space according to the data protection information,
wherein the first determination is made independently of the second determination, and
wherein the protection control information storage section stores protection control information for indicating validation of an entire protection of the instruction address space, independently of protection of the data address space, in terms of a whole of instruction protection registers of the instruction protection information storage section.

2. The data processing apparatus according to claim 1, wherein, when the first protection information comprises a second value, the protection violation determination section permits the instruction execution section to access an entirety of the instruction address space.

3. The data processing apparatus according to claim 1, wherein, when the second protection information comprises a second value, the protection violation determination section permits the instruction execution section to access an entirety of the data address space.

4. The data processing apparatus according to claim 1, wherein, if the first protection information comprises a second value and the partial address space specified by the instruction protection information includes an access destination address of an access request of the instruction execution section, the protection violation determination section permits the access request of the instruction execution section.

5. The data processing apparatus according to claim 1, wherein, if the first protection information comprises a second value and the partial address space specified by the instruction protection information does not include an access destination address of an access request of the instruction execution section, the protection violation determination section prohibits the access request of the instruction execution section.

6. The data processing apparatus according to claim 1, wherein each of the instruction protection registers includes an instruction address assignment section that stores the instruction protection information.

7. The data processing apparatus according to claim 6, wherein said each of the instruction protection registers further includes a valid bit storage section that indicates whether an assignment of the partial address space by a corresponding address assignment section is valid.

8. The data processing apparatus according to claim 7, wherein, when the protection control information indicates that the entire protection of the instruction address space is invalid, the protection violation determination section permits an access to the instruction address space, regardless of values of the valid bit storage sections of the instruction protection registers.

9. The data processing apparatus according to claim 1, wherein each of the instruction protection registers includes a valid bit storage section that indicates whether an assignment of the partial address space by a corresponding address assignment section is valid.

10. The data processing apparatus according to claim 9, wherein, when the protection control information indicates the entire protection of the instruction address space is invalid, the protection violation determination section permits an access to the instruction address space, regardless of values of the valid bit storage sections of the instruction protection registers.

11. The data processing apparatus according to claim 1, further comprising a central processor that includes the instruction execution section and the protection control information storage section.

12. The data processing apparatus according to claim 1, wherein the protection control information storage section includes a first bit that is associated with indicating the validation of the entire protection of the instruction address space.

13. The data processing apparatus according to claim 12, wherein the first bit is independent from the protection of the data address space.

14. The data processing apparatus according to claim 13, wherein the protection control information storage section further includes a second bit that is associated with the protection of the data address space.

15. The data processing apparatus according to claim 14, wherein the second bit is independent of indicating the validation of the entire protection of the instruction address space.

16. The data processing apparatus according to claim 1, wherein the protection control information storage section stores protection control information for indicating the validation of the entire protection of the instruction address space not in terms of respective instruction protection registers.

* * * * *